United States Patent [19]

Bowden

[11] Patent Number: 4,722,030
[45] Date of Patent: Jan. 26, 1988

[54] VEHICULAR LIGHT BAR

[75] Inventor: Scott R. Bowden, Harlingen, Tex.

[73] Assignee: Friebele & Mardis Investments, Harlingen, Tex. ; a part interest

[21] Appl. No.: 884,550

[22] Filed: Jul. 11, 1986

Related U.S. Application Data

[63] Continuation-in-part of Ser. No. 711,848, Mar. 14, 1985, abandoned.

[51] Int. Cl.4 .................................................. B60Q 1/08
[52] U.S. Cl. .......................................... 362/69; 362/74; 362/233; 362/287; 362/423
[58] Field of Search ........................ 362/35, 61, 66, 69, 362/74, 80, 233, 238, 250, 269, 272, 285, 287, 368, 418, 419, 423, 427, 428

[56] References Cited

U.S. PATENT DOCUMENTS

| | | | |
|---|---|---|---|
| 1,234,389 | 7/1917 | Reen | 362/66 |
| 1,284,955 | 11/1918 | Thompson | 362/66 |
| 1,510,200 | 9/1924 | Watson | 362/80 |
| 1,571,824 | 2/1926 | Weiland | 362/66 |
| 1,634,043 | 6/1927 | Pierce | 362/66 |
| 2,662,605 | 12/1953 | Riggs | 362/66 |
| 2,737,575 | 3/1956 | Ross | 362/66 |
| 3,634,677 | 1/1972 | Wolffing-Seelig et al. | 362/71 |
| 3,846,627 | 11/1974 | Chastan | 362/71 |
| 4,112,486 | 9/1978 | Tovi | 362/419 |
| 4,189,709 | 2/1980 | Gosswiller | 362/217 |
| 4,192,427 | 3/1980 | Bergman | 362/66 |
| 4,306,279 | 12/1981 | Cohen | 362/272 |
| 4,353,110 | 10/1982 | Ellis | 362/272 |
| 4,428,037 | 1/1984 | Cardoza et al. | 362/427 |
| 4,473,868 | 9/1984 | Moore | 362/274 |
| 4,482,939 | 11/1984 | Tishman | 362/272 |
| 4,600,973 | 7/1986 | Mori | 362/419 |

Primary Examiner—Craig R. Feinberg
Assistant Examiner—David A. Okonsky
Attorney, Agent, or Firm—G. Turner Moller

[57] ABSTRACT

A light bar, primarily for a vehicle, comprises a support extending transversely across the top of the vehicle. Attached to the support are one or more lamps which are mounted for selective rotary movement about a horizontal axis transverse to the vehicle and a vertical axis. By the manipulation of suitable controls inside the vehicle, or by manipulation of a remote control actuator, the driver is capable of aiming the light at a desired object or scanning a desired region.

20 Claims, 7 Drawing Figures

VEHICULAR LIGHT BAR

This application is a continuation-in-part of application Ser. No. 06/711,848, filed Mar. 14, 1985 and now abandoned.

This invention relates to a light bar which is normally attached to the roof of a vehicle and carries one or more lamps.

Conventional vehicular light bars are mounted on the top of off road vehicles, automobiles driven by security personnel or other vehicles from which greater nighttime visibility is desirable. Typical prior art light bars incorporate two or more stationary forwardly directed spotlights. It will be seen that these spotlights illuminate an area forwardly of the vehicle. The area of illumination can only be altered by moving the vehicle.

One of the earliest type adjustably mounted vehicular lights was typically used by law enforcement officers. This adjustable spotlight was typically mounted on the driver's door and included a handle on the inside of the vehicle so that the spotlight could be rotated in its housing.

In the early days of automobiles, there were many proposals to mount vehicular headlights for rotation about a vertical axis and/or for rotation about an axis transverse to the direction of travel as shown in the following U.S. Pat. Nos. 1,234,389; 1,284,955; 1,510,200; 1,571,824 and 1,634,043. Other disclosures of interest relating to this invention are found in U.S. Pat. Nos. 3,634,677 and 3,846,627.

This invention relates to a light bar having one or more forwardly directed lamps. The light bar is capable of selective, limited movement about a horizontal axis transverse to its support. This movement causes the illuminated area in front of the vehicle to move toward and away from the support. The lamps are also mounted for movement about spaced vertical axes. This adjusts the illuminated area from side-to-side of the support. Since both mechanisms may be moved simultaneously, it is possible to move the illuminated area diagonally of the support. The light bar of this invention is particularly suited to be attached to a vehicle above the roof thereof.

These functions are quite desirable in situations where increased nighttime visibility is required. One of these situations is found by off road vehicle drivers where it is desired to illuminate the area which is about to be driven upon. Another common situation where these type features are desirable is where security of law enforcement personnel have approached a location at night and seek to locate the source of trouble or to determine if something is amiss.

It is an object of this invention to provide a light bar having increased capabilities of aiming or moving the illuminating lamps.

Another object of this invention is to provide an improved roof mounted illuminating device for vehicles.

Other objects and advantages of this invention will become more fully apparent as this description proceeds, reference being made to the accompanying drawings and appended claims.

IN THE DRAWINGS

Figure 1:
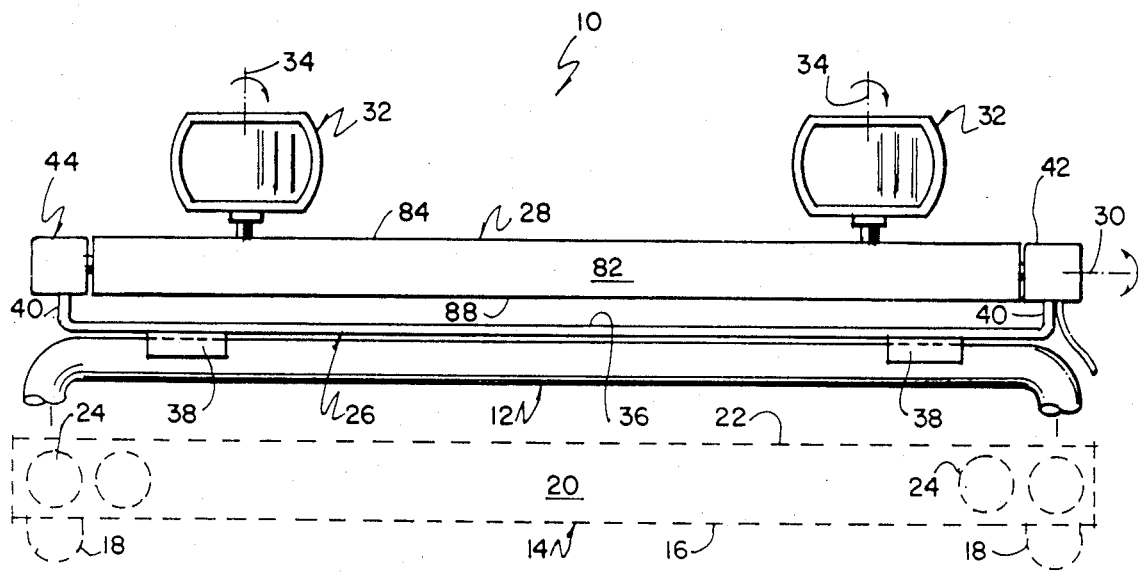
FIG. 1 is a front elevational view of a light bar constructed in accordance with the principles of this invention which is mounted on the roll bar of an off road vehicle.
Figure 2:
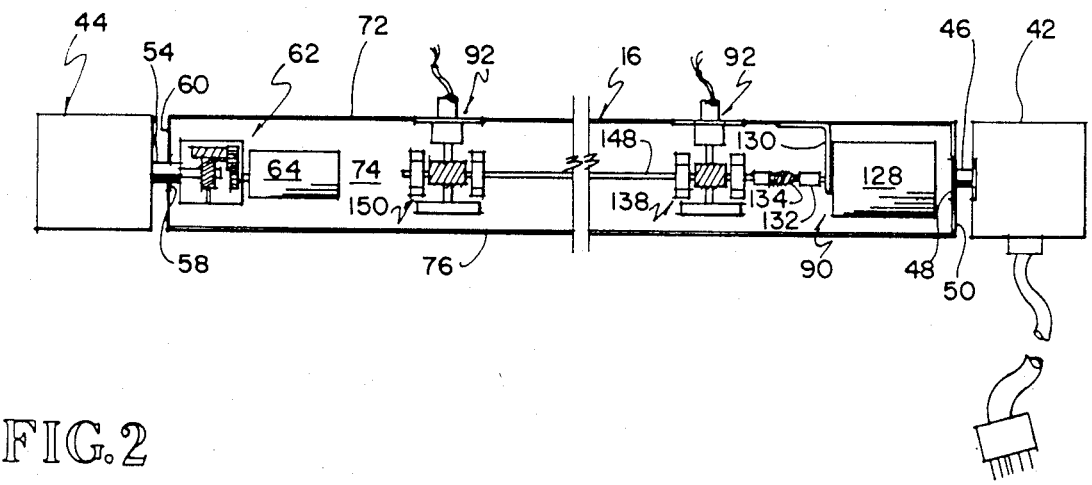
FIG. 2 is an enlarged front elevational view of the device of FIG. 1, part of the housing being removed to expose the operating mechanism.

Referring to FIG. 1, the vehicular light bar 10 of this invention is illustrated as mounted on a roll bar 12 of an off road type vehicle 14 of any suitable type. The vehicle 14 includes a chassis 16 having a plurality of wheels 18, a body 20 having a roof 22 and a plurality of stationary forwardly directed headlights 24. The light bar 10 comprises, as major components, a support 26, a member or housing 28 mounted for rotation about a transverse horizontal axis 30 and one or more lamp assemblies 32 mounted for rotation about spaced vertical axes 34. It will be evident that rotation of the member 28 about the axis 30 causes the illuminated areas cast by the lamp assemblies 32 to move toward and away from the vehicle 14 on which the light bar 10 is attached. Similarly, it will be evident that rotation of the lamp assemblies 32 about their axes 34 causes the illuminated areas to sweep from side-to-side of the vehicle 14.

The support 26 may be of any suitable type, such as a rail connected to the drip molding of the vehicle 14, but is illustrated as an elongate bar 36 having a pair of semi-cylindrical brackets 38 thereon for receiving the upper curved portion of the roll bar 12. The brackets 38 are connected to the roll bar 12 in any suitable manner, as by the provision of suitable threaded fasteners (not shown). The ends of the support 26 each comprise upturned ears 40 supporting a pair of box shaped compartments 42, 44.

The compartment 42 comprises a cylindrical rod 46 extending into a bearing assembly 48 provided by the housing 28. Conveniently, the bearing assembly 48 may comprise a simple sleeve rigid with an end wall 50 of the housing 28.

Figure 3:
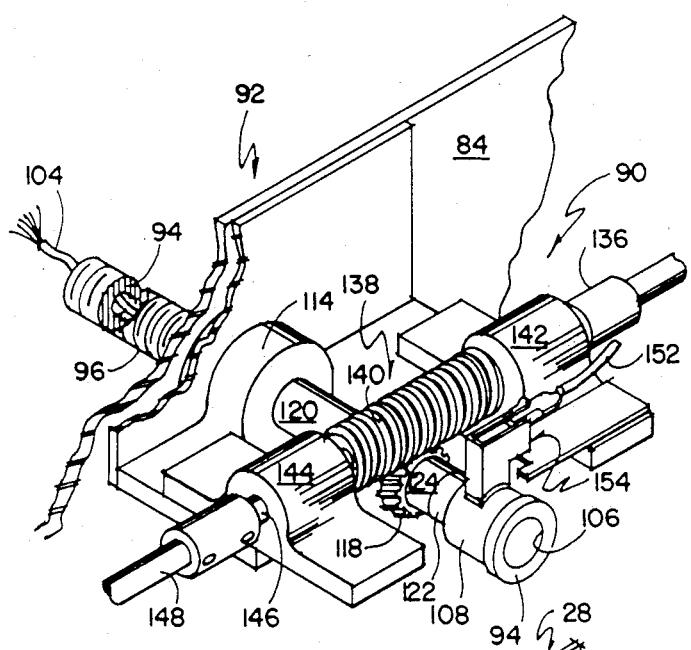
FIG. 3 is an enlarged isometric view of the mechanism for rotating the light bar about a horizontal axis.

As shown best in FIG. 3, the housing 44 includes an end wall 52 having a rod 54 rigidly secured thereto in any suitable manner, as by the provisions of a sleeve 56. The rod 54 extends through a bearing assembly 58 in an end wall 60 of the housing 28. Conveniently, the bearing assembly 58 may comprise a simple sleeve affixed to the end wall 60. Cooperating with the rod 54 is means 62 for rotating the housing 28 about the axis 30.

The rotating means 62 conveniently comprises an electric motor 64 having an output 66 including a pinion gear 68 thereon in meshing engagement with a pinion gear 70 driving a worm gear 72. The worm gear 72 drives a gear 74 comprising the input of a second worm gear 76 in meshing engagement with a gear 78. Since the gear 78 is affixed to the rod 54, it will be evident that the gear 78 cannot rotate about the axis 30. Consequently, the worm gear 76 walks around the periphery of the gear 78 thereby rotation the gear housing 80 about the axis 30. Since the housing 28 is rigidly connected to the gear housing 80, the housing 28 likewise rotates about the axis 30 in response to operation of the electric motor 64. Since the electric motor 64 is reversible, it will be seen that the housing 28 may be rotated in either direction about the axis 30.

The housing 28 includes the end walls 50, 60, a front wall 82, a top wall 84, a back wall 86 and a bottom wall 88 to provide an enclosure for the rotating means 62 as well as a support for the lamp assemblies 32 and an enclosure for means 90 rotating the lamp assemblies 32 about their axes 34.

The housing 28 includes a pair of fixtures 92 for receiving the lamp assemblies 32. The fixtures 92 include a tube 94 having an exteriorly threaded upper end 96 threadably receiving a nut 98 captivated within a bracket 100 comprising part of the lamp assemble 32. The lamp assembly 32 also includes a stub wire 102 which is connected in any suitable manner, as by the provision of a wire nut (not shown) to a wire 104 extending through the inner passage 106 of the tube 94 to connect to a slip ring 108 spaced from the tube 94 by an insulating collar 110.

The tube 94 is mounted for limited rotary movement by an assembly 112 comprising a pair of spaced bearing blocks 114, 116. For purposes more fully pointed out hereinafter, a gear 118 is affixed to the tube 94 between the bearing assemblies 114, 116. To limit axial movement of the tube 94 relative to the bearing assemblies 114, 116, there is provided a series of sleeves 120, 122, 124 about the periphery of the tube 94. Conveniently, the sleeve 124 is made rigid with the tube 94 in any suitable manner, as by the provision of one or more set screws 126.

The rotating means 90 includes an electric motor 128 secured to a bracket 130 carried by the housing 28 and having an output 132 connected by a member 134 to an input 136 of a rotary-to-rotary motion conversion device 138 of any suitable type. The motion conversion device 138 preferably includes a worm gear 140 in meshing engagement with the gear 118 carried by the tube 94. The worm gear 140 is mounted for rotation in a pair of bearing blocks 142, 144 and includes an output 146 connected to a shaft 148 leading to a second motion conversion device 150 associated with the other of the lamp fixtures 92. Thus, a single motor 128 rotates both of the lamp fixtures 92.

It will be seen that energization of the motor 128 rotates the output 132 thereby rotating the member 134 and the input 136 which rotates the worm gear 140. Rotation of the worm gear 140 causes the gear 118 to rotate thereby rotating the tube 94 to rotate the lamp assembly 32 about its axis 34. It will be evident that the motion conversion devices 138, 150 cause concurrent rotation of the lamp assemblies 32 in the same rotary direction. It will also be evident that the motor 128 can be driven in an opposite direction to reverse the rotation of the lamp assemblies 32.

Figure 4:
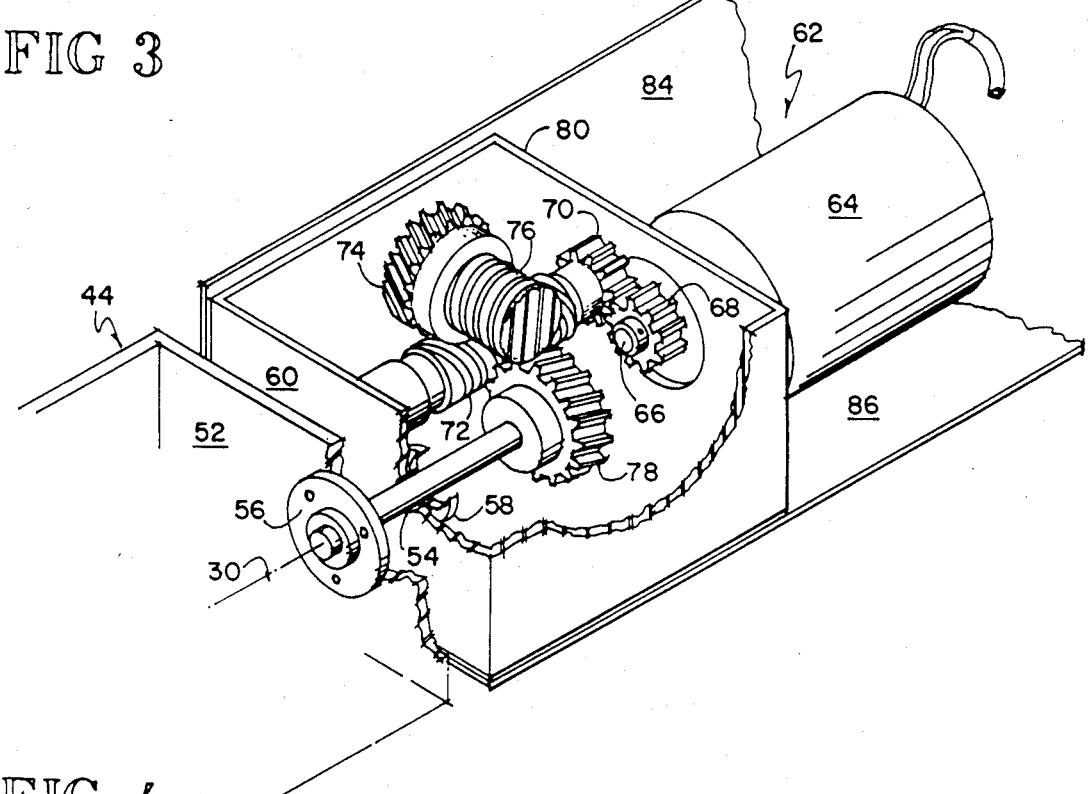
FIG. 4 is an enlarged isometric view of the mechanism used to rotate the lamps about their vertical axis.
Figure 5:
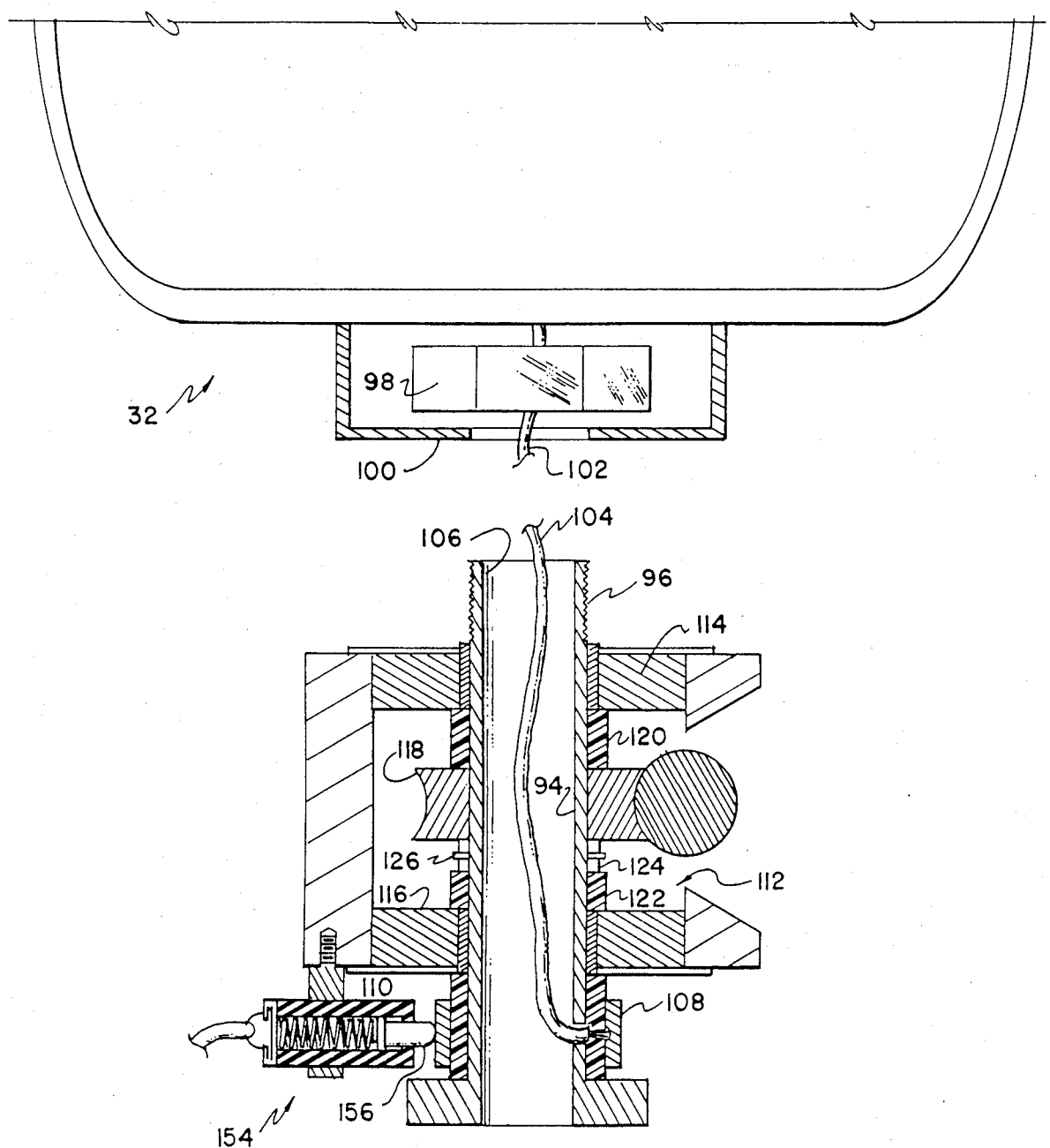
FIG. 5 is an enlarged cross-sectional view of a lamp fixture of this invention.

It will be appreciated that the lamp assemblies 32 are rotatable for a limited extent, usually not exceeding one complete revolution. Accordingly, the delivery of electricity to the lamp assemblies 32 is not extraordinarily complex. This is accomplished as shown in FIGS. 4 and 5 where a wire 152 connects to a commutator 154 having a brush 156 in engagement with the slip ring 108. Consequently, an electrical path is provided from the wire 152 to the wire 104.

Figure 6:
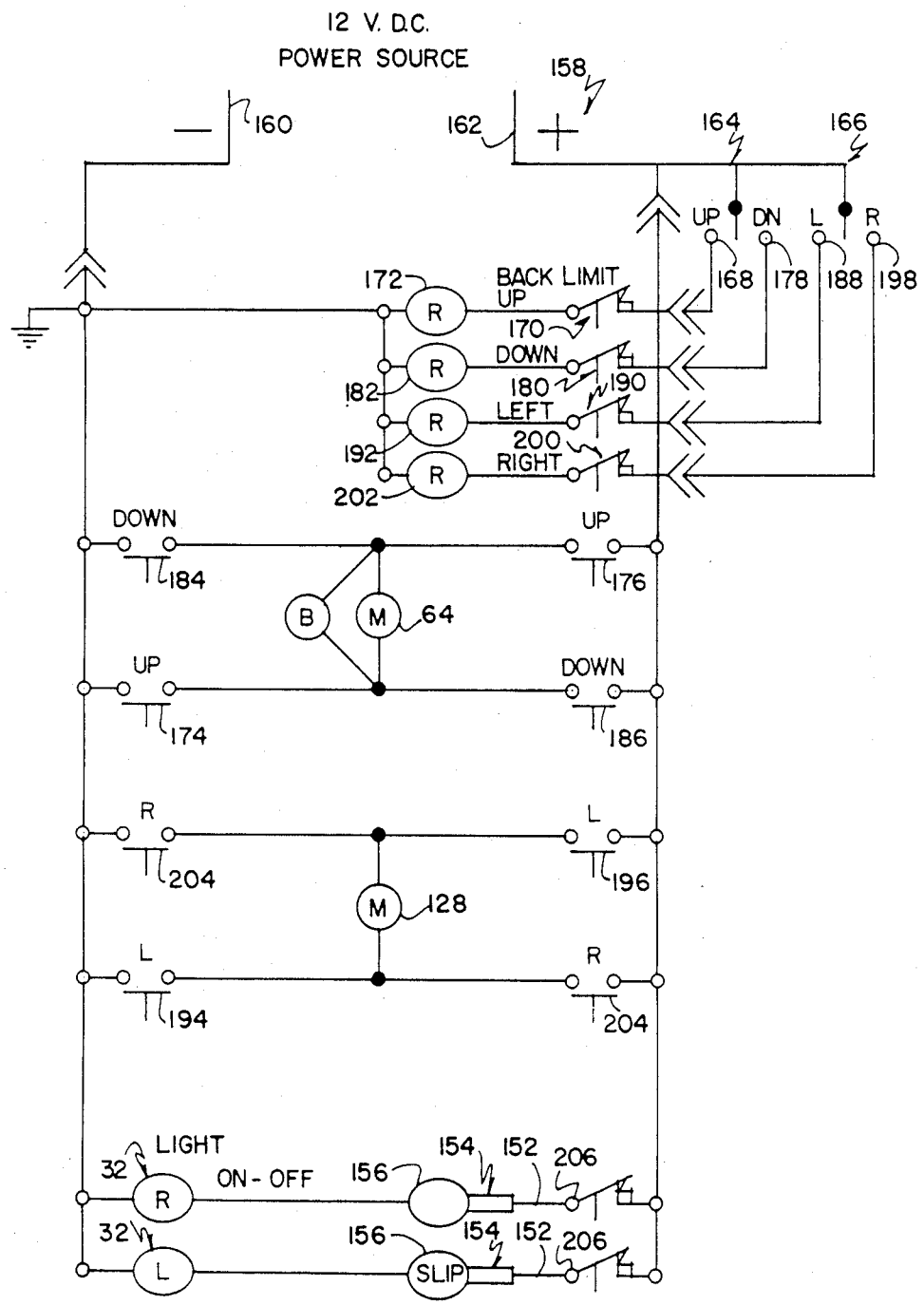
FIG. 6 is a schematic diagram of the electrical circuit used in this invention.

Referring to FIG. 6, there is schematically shown an electric circuit 158 for energizing the motors 64, 128 and the lamp assemblies 32. The circuit 158 includes terminals 160, 162 at the vehicular battery (not shown), and up-down switch 164 controlling the motor 64 and a left-right switch 166 controlling the motor 128. The switch 164 is a typical single pole double throw switch having an up terminal 168 connected through a limit switch 170 to the coil of a relay 172 which acts to close a pair of relay contacts 174, 176 to drive the motor 64 in a direction to tilt the housing 28 backwardly in order to elevate the illuminated area cast by the lamp assemblies 32. The limit switch 170 acts to prevent over rotation of the housing 28 so that the lamp assemblies 32 are not driven into the roll bar 12 or support 26.

The up-down switch 164 also includes a down terminal 178 connected through a limit switch 180 to the coil of a relay 182 which acts to close a pair of contacts 184, 186 to drive the motor 64 in a direction to tilt the housing 28 so that the illuminated areas cast by the lamp assemblies 32 comes closer to the vehicle 14.

The left-right switch 166 includes a terminal 188 connected through an optional limit switch 190 to the coil of a relay 192 which acts to close a pair of contacts 194, 196 which energizes the motor 128 in a direction to rotate the lamp assemblies 32 toward the right of the vehicle 14 as viewed from the passenger's seat. In addition, the left-to-right switch 166 includes a terminal 198 connected through a limit switch 200 to the coil of a relay 202 which acts to close a pair of contacts 204 to energize the motor 128 to rotate the lamp assemblies 32 to the right as viewed from the passenger's seat of the vehicle 14.

The circuit 158 also includes means for energizing the lamp assemblies 32 which include a pair of on-off switches 206 connected to the wires 152 and commutator-slip ring assemblies 154, 156 to each of the lamp assemblies 32.

Figure 7:
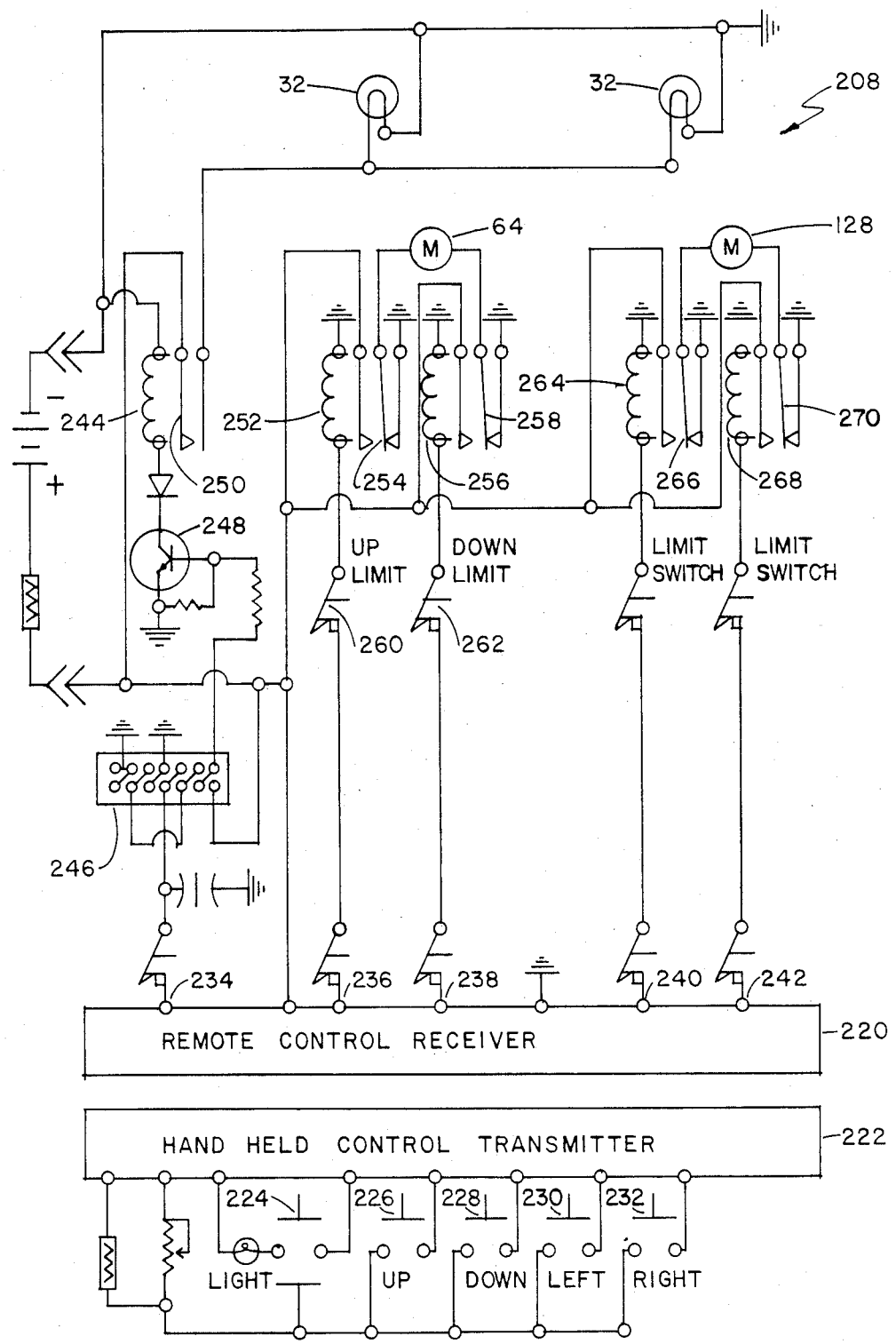
FIG. 7 is a schematic diagram of another embodiment of an electrical control circuit used in this invention illustrating a remote control arrangement.

Referring to FIG. 7, there is illustrated another feature of this invention comprising means 208 for controlling the motors 64, 128 from a location outside and spaced from the vehicle 14. To this end, the controlling means 208 comprises a wireless remote control unit including a receiver 220 which may be mounted in one of the compartments 42, 44 but which is preferably mounted in a separate compartment affixed to and located rearwardly of the support bar 36. The controlling means 208 also includes a transmitter 222 preferably housed in a hand held unit (not shown). The transmitter 222 and receiver 220 may be of the short range radio frequency type commonly used with remote control garage door units. Transmitter 222 is provided with five control switches 224–232 and, in response to the closing of any one of these switches, transmits a signal to the receiver 220, a distinct signal being generated for each of the switches. The receiver unit 220 has five output ports 234–242 corresponding, respectively, to the transmitter control switches and functions in response to a received signal to energize that one of the ports corresponding to the selected switch of the transmitter.

The first output port 234 corresponds to the LIGHT switch 224 and, when energized, actuates relay 244 through a holding circuit comprised of integrated circuit 246 and transistor 248. Contact 250 of the relay 244 closes to complete the power supply circuit for the lamps 32. The holding circuit serves to maintain the relay energized following termination of the signal from the transmitter and does so until switch 224 is again closed at which time the relay 244 is deenergized and the lamps 32 turned off. Output ports 236 and 238 correspond, respectively, to UP switch 226 and DOWN switch 228 and, through limit switches 260 and 262, relays 252 and 256 and relay contacts 254 and 258, control the housing rotating motor 64. For example, upon closing switch 226, relay 252 is energized and connects contact 254 to the power source so that motor 64 rotates to move the light beams upwardly. Upon opening of the switch 226, the corresponding relay is deenergized so that the motor 64 operates only during the interval that the switch is held in closed position. Similarly, ports 240 and 242 correspond to LEFT switch 230 and RIGHT switch 232, respectively, and control the energization of the lamp rotating motor 128 through relays 264 and 268 and contacts 266 and 270.

It will be appreciated that the control arrangement of FIG. 7 allows the user to fully control the lights from a location remote from the vehicle. As the positioning motors 64 and 128 operate only when the corresponding switches of the transmitter unit 222 are closed, precise aiming of the lights by momentary actuation of the switches is possible.

Although the invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A light bar comprising
   a support for attachment to an object;
   a member rotatably mounted on the support for selective movement about a horizontal axis;
   a lamp fixture;
   means mounting the lamp fixture on the member for selective movement about a vertical axis;
   means for selectively moving the member about the horizontal axis including a first electric motor and means connecting the first electric motor and the member;
   means for selectively moving the lamp fixture about the vertical axis including a second electric motor carried by the member and means connecting the second electric motor and the lamp fixture; and
   means for simultaneously energizing the first and second electric motors for simultaneously rotating the lamp fixture about the vertical axis and rotating the member about its horizontal axis.

2. The light bar of claim 1 comprising a plurality of lamp fixtures, the fixture mounting means comprising means mounting the fixtures for selective movement about spaced vertical axes and the fixture moving means comprises means for selectively and simultaneously moving the lamp fixtures about the vertical axis, the selective and simultaneous moving means comprising the second electric motor carried by the member and having an output and means drivably connecting the motor output and the lamp fixtures.

3. The light bar of claim 2 further comprising a lamp received in each of the plurality of lamp fixtures.

4. The light bar of claim 1 wherein the support comprises a section having means thereon for connection to a vehicular component and a pair of upstanding ears rigid with the section and thereby rigid with the vehicular component and including bearings defining the horizontal axis, the member being mounted between the ears for selective movement about the horizontal axis.

5. The light bar of claim 1 further comprising a vehicle including a chassis having wheels thereon, a body having a roof, and a plurality of stationary headlights, the support being connected to the vehicle above the roof thereof.

6. The combination of claim 5 wherein the vehicle includes a roll bar on the outside thereof above the roof and the support comprises means attached to the roll bar.

7. A light bar comprising
   a first support member for attachment to an object;
   a second member mounted on the first member for selective movement about a horizontal axis;
   a lamp fixture;
   means mounting the lamp fixture on the second member for selective movement about a vertical axis;
   means for selectively moving the second member about the horizontal axis including an electrically driven motor carried by one of the first and second members, a gear reducer driven by the motor and having an output member, the output member being rigid with the other of the first and second members and
   means for selectively moving the lamp fixture about the vertical axis.

8. The light bar of claim 7 wherein the motor is carried by the second member and the output member is rigid with the first member.

9. The light bar of claim 7 further comprising a vehicle including a chassis having wheels thereon, a body having a roof, and a plurality of stationary headlights, the support member being connected to the vehicle above the roof thereof.

10. The combination of claim 9 wherein the vehicle includes a roll bar on the outside thereof above the roof and the support member comprises means attached to the roll bar.

11. A light bar comprising
    a support for attachment to an object;
    a member mounted on the support for selective movement about a horizontal axis;
    a lamp fixture;
    means mounting the lamp fixture on the member for selective movement about a vertical axis;
    means for selectively moving the member about the horizontal axis; and
    means for selectively moving the lamp fixture about the vertical axis including an electrically driven motor carried by the member and having an output member rotatable about an axis and a rotary-to-rotary motion conversion device having an input member connected to the motor and an output member at right angles to the input member, the output member of said conversion device being connected to the lamp fixture.

12. The light bar of claim 11 wherein the motor output member provides an axis generally parallel to the horizontal axis.

13. The light bar of claim 11 further comprising a vehicle including a chassis having wheels thereon, a body having a roof, and a plurality of stationary headlights, the support being connected to the vehicle above the roof thereof.

14. The combination of claim 13 wherein the vehicle includes a roll bar on the outside thereof above the roof and the support comprises means attached to the roll bar.

15. The light bar of claim 11 wherein the rotary-to-rotary motion conversion device comprises a worm gear having the input thereon and a pinion gear in meshing engagement with the worm gear, the output being carried by the pinion.

16. The light bar of claim 11 comprising a plurality of lamp fixtures, the fixture mounting means comprises means mounting the fixtures for selective movement about spaced vertical axes and the fixture moving means comprises a plurality of substantially identical rotary-to-rotary motion conversion devices each comprising a worm gear having an input thereon and a pinion gear in meshing engagement with the worm gear, the output being carried by the pinion gear, the input of a first of the motion conversion devices being connected to the motor, the input of a second of the motion conversion devices being connected to the worm gear of the first motion conversion device.

17. A light bar comprising
a support for attachment to an object;
a member rotatably mounted on the support for selective movement about a horizontal axis;
a lamp fixture;
means mounting the lamp fixture on the member for selective movement about a vertical axis;
means for selectively moving the member about the horizontal axis including a first electric motor and means connecting the first electric motor and the member;
means for selectively moving the lamp fixture about the vertical axis including a second electric motor carried by the member and means connecting the second electric motor and the lamp fixture; and
means for energizing the first and second electric motors for rotating the lamp fixture about the vertical axis and rotating the member about its horizontal axis.

18. The light bar of claim 17 wherein the energizing means comprises means for receiving a signal and operatively connected to the first and second electric motors for starting and stopping the motors in response to receiving the signal and a transmitter, unconnected to the receiver, for sending the signal and remotely activating the receiver and energizing the first and second electric motors.

19. The light bar of claim 18 wherein the transmitter includes a plurality of control switches and is operative to transmit a distinct signal corresponding to each of the switches, the means for receiving being responsive to the distinct signals correspondingly controlling the motors.

20. The light bar of claim 19 wherein the energizing means includes means for energizing the lights in response to one of the distinct signals from the transmitter.

* * * * *